W. F. KASPER.
WHEEL.
APPLICATION FILED JAN. 3, 1922. RENEWED JULY 31, 1922.

1,434,955.

Patented Nov. 7, 1922

Inventor
WALTER F. KASPER
By Paul Paul
ATTORNEYS

Patented Nov. 7, 1922.

1,434,955

UNITED STATES PATENT OFFICE.

WALTER F. KASPER, OF FAIRMONT, MINNESOTA, ASSIGNOR TO FAIRMONT GAS ENGINE & RAILWAY MOTOR CAR CO., OF FAIRMONT, MINNESOTA, A CORPORATION.

WHEEL.

Application filed January 3, 1922, Serial No. 526,766. Renewed July 31, 1922. Serial No. 578,852.

*To all whom it may concern:*

Be it known that I, WALTER F. KASPER, a citizen of the United States, resident of Fairmont, county of Martin, State of Minnesota, have invented certain new and useful Improvements in Wheels, of which the following is a specification.

The object of my invention is to provide a wheel of strong, durable construction and one that is particularly adapted for railway motor cars.

A further object is to provide a wheel having a considerable degree of resiliency between the hub and rim to the end that it will provide an easy riding support for the car truck frame and be able to absorb or sustain a considerable shock without damage.

Other objects of the invention will appear from the following detailed description.

In the accompanying drawings forming part of this specification,

Figure 1:
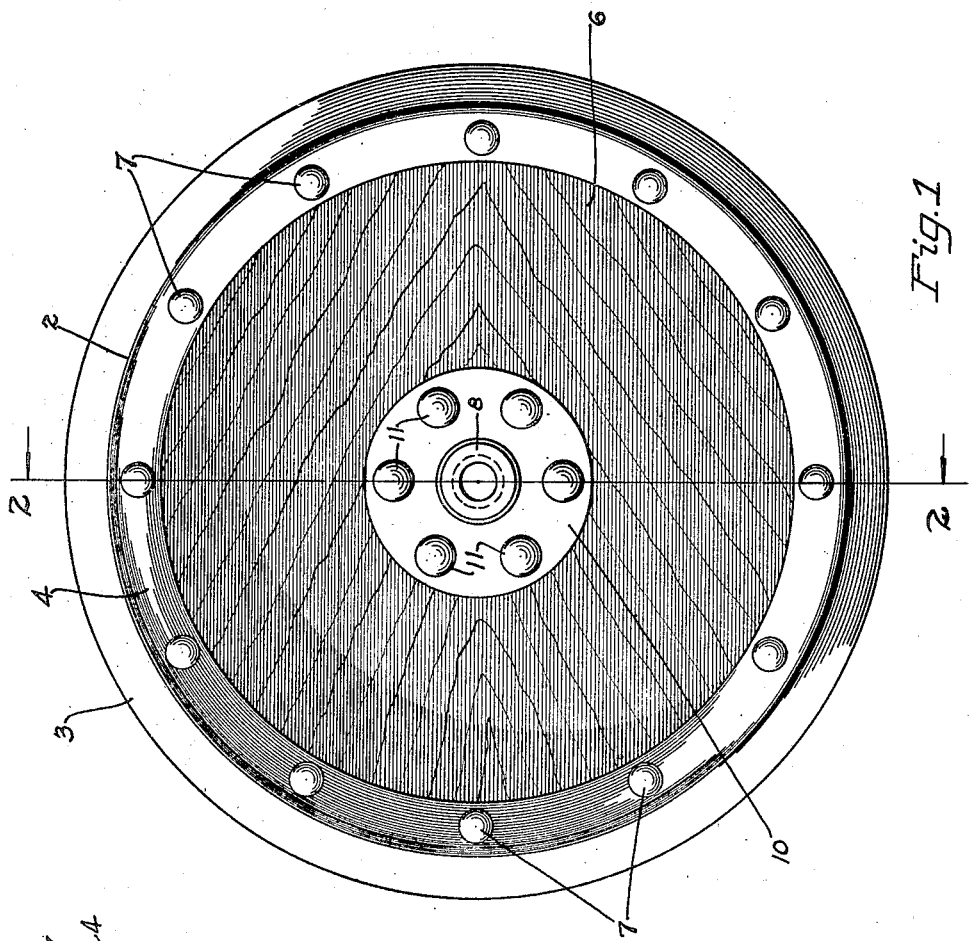
Figure 1 is a side elevation of a wheel embodying my invention.
Figure 2:
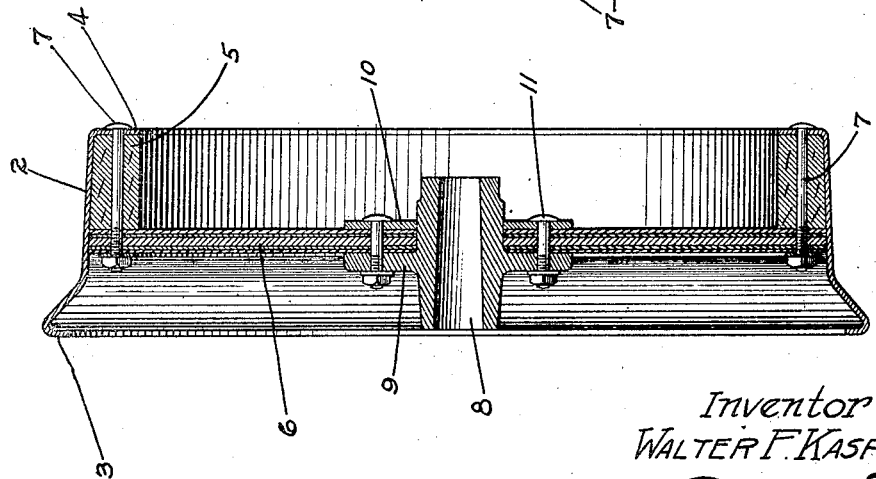
Figure 2 is a sectional view on the line 2—2 of Figure 1.

In the drawing, 2 represents the tread of a sheet steel rim, pressed or drawn into suitable shape by dies, with an annular rib 3 on one edge extending outwardly beyond the face of the tread to form the usual flange for holding the wheel on the track rails. On the opposite edge of the rim is an inwardly turned annular flange 4 and seated against the inner face of this flange is a wooden felloe 5 which also bears against the inner surface of the tread of the wheel. This felloe ring forms a spacer between the flange 4 and a disc 6 which is seated against the inner edge of the felloe and is secured thereto and to the flange 4 by suitable means, such as bolts 7. This disc is preferably made up of several plies of wood and is referred to in the trade by the expression "plywood." I have shown a core or center disc and correspondingly shaped thinner discs on each side thereof forming, in effect, a laminated sheet within the wheel fitting snugly against the inner surface of the tread portion and clamped to the wooden felloe and closing the opening through the wheel. I have found a disc made in this way to be strong and durable, of comparatively light weight and the resiliency of the laminated structure produces an easy riding wheel and one that is capable of sustaining and absorbing heavy shocks without damage.

A hub 8 is centrally mounted in the laminated disc and provided with flanges 9 and 10 secured to the disc by suitable means, such as bolts 11. This invention is particularly adapted for the railway motor car of our improved design, as it is strong and durable and at the same time comparatively light in weight, so that the car can be handled, easily lifted to or from the track rails, or loaded into a baggage or other car for transportation.

I claim as my invention:

1. A wheel comprising a sheet metal ring having an annular rib formed on one edge and extending outwardly beyond the tread of the wheel, the opposite edge of said ring having an inwardly turned annular flange, a fibrous felloe fitting within the angle between said flange and the wheel tread, a laminated disc fitting within said ring and seated against the inner edge of said felloe, bolts passing through said disc and said felloe and said flange and securing them rigidly together, and a hub centrally mounted in said disc.

2. A car wheel comprising a sheet metal ring having an annular rib formed thereon at one edge and an inwardly turned flange at its opposite edge on the other side of the wheel tread, a wooden felloe fitting within said ring and seated against said flange, and the inner face of the tread, a disc composed of a plurality of thin wooden sheets fitting within said ring and seated against the inner edge of said felloe and secured thereto and to said flange, and a hub centrally mounted in said disc.

3. A wheel comprising a sheet metal ring having an annular rib formed on one edge and extending outwardly beyond the tread of the wheel, the opposite edge of said ring having an inwardly turned annular flange, a fibrous felloe fitting within the angle between said flange and the wheel tread, a disc of comparatively light material fitting within said ring and seated against the inner edge of said felloe, bolts passing through said disc and said felloe and said flange and securing them rigidly together, and a hub centrally mounted in said disc.

4. A wheel comprising a metallic ring having an annular rib formed on one edge and extending outwardly beyond the tread of the wheel, the opposite edge of said ring having an inwardly turned flange, a felloe fitting within the angle between said flange and the wheel tread, a disc fitting within said ring and seated against the inner edge of said felloe, means for securing said disc, said felloe and said flange together, and a hub centrally mounted in said disc.

5. A car wheel, comprising a sheet metal ring having an annular rib formed thereon at one edge, and an inwardly turned flange at its opposite edge on the other side of the wheel tread, a felloe fitting within said ring and seated against said flange and the inner face of the tread, a disc composed of comparatively light material, fitting within said ring and seated against the inner edge of said felloe, and secured thereto, and to said flange, and a hub centrally mounted in said disc.

In witness whereof, I have hereunto set my hand this 27th day of December, 1921.

WALTER F. KASPER.